3,123,571
DI-ARENE METAL CATALYSTS
Darrell W. Walker and Edward L. Czenkusch, Bartlesville, Okla., assignors to Phillips Petroleum Company, a corporation of Delaware
No Drawing. Filed Dec. 14, 1959, Ser. No. 859,159
7 Claims. (Cl. 252—430)

This invention relates to catalyst compositions comprising certain di-arene metals deposited on porous supports of silica, silica-alumina, and alumina. One aspect of the invention pertains to the polymerization of ethylene. Another aspect is concerned with the hydrogenation of unsaturated hydrocarbons, such as olefins, with supported di-arene metal catalysts.

In recent years, new di-arene metal compounds have become commercially available. These compounds are sometimes described by the term "sandwich compounds," and alternatively the prefix "di" in the name is replaced by "bis." When certain of these compounds were evaluated as catalysts for the polymerization of olefins, their activity was very low or negligible. These compounds also failed to show any activity in the hydrogenation of hydrocarbons. We have now discovered that active catalyst compositions can be prepared by impregnation of solid supports with certain of these di-arene metal compounds. The solid catalysts which are prepared in accordance with this invention are free-flowing powders which have high utility for the polymerization of ethylene and for hydrogenation of unsaturated hydrocarbons, such as olefins, in fluidized catalyst processes. It is also feasible to form the powders into various shapes, such as pills and pellets, in conventional manner, for use in moving or fixed beds.

In the preparation of these new catalyst compositions there is employed an arene metal compound having the structure

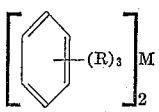

wherein M represents chromium, molybdenum, or vanadium, and R is selected from the group hydrogen and alkyl radicals, said alkyl radicals having 1 to 6, inclusive, carbon atoms. Examples of compounds which are employed are illustrated by the following.

Dibenzene chromium
Dibenzene vanadium
Dibenzene molybdenum
Ditoluene chromium
Ditoluene vanadium
Ditoluene molybdenum
Di-o-xylene chromium
Di-o-xylene vanadium
Di-o-xylene molybdenum
Di-p-xylene chromium
Di-p-xylene vanadium
Di-p-xylene molybdenum
Dicumene chromium
Dicumene vanadium
Dicumene molybdenum
Dimesitylene chromium
Dimesitylene vanadium
Dimesitylene molybdenum
Di(n-propylbenzene) chromium
Di(n-propylbenzene) vanadium
Di(n-propylbenzene) molybdenum
Di(1,3,5-triethylbenzene) chromium
Di(1,3,5-triethylbenzene) vanadium
Di(1,3,5-triethylbenzene) molybdenum
di(1,3-diethyl-4-hexylbenzene) chromium
Di(1,3-diethyl-4-hexylbenzene) vanadium
Di(1,3-diethyl-4-hexylbenzene) molybdenum
Di(1,3-dipentylbenzene) chromium
Di(1,3-dipentylbenzene) vanadium
Di(1,3-dipentylbenzene) molybdenum
Di(1,4-dihexylbenzene) chromium
Di(1,4-dihexylbenzene) vanadium
Di(1,4-dihexylbenzene) molybdenum
Di(1,3,5-trihexylbenzene) chromium
Di(1,3,5-trihexylbenzene) vanadium
Di(1,3,5-trihexylbenzene) molybdenum
Di[1-(2-methylbutyl)benzene] chromium
Di[1-(2-methylbutyl)benzene] vanadium
Di[1-(2-methylbutyl)benzene] molybdenum In these compounds, the metal is believed to be in the zero valence state. The compounds are liquids and solids soluble in many organic solvents. In the practice of this invention, solutions of these compounds can be employed to facilitate impregnation of the solid support. Solvents which are non-polar liquids at ambient temperatures and which are sufficiently volatile to facilitate removal by evaporation are generally preferred. However, less volatile solvents can be readily displaced by more volatile solvents, and the latter can be readily distilled. Examples of suitable solvents include the alkanes, such as hexane, octane, and decane; the cycloalkanes, such as cyclopentane, cyclohexane, and methylcyclohexane; aromatic compounds such as benzene, toluene and xylene; and many other liquids such as chloroform, carbon tetrachloride, diethyl ether, etc. Mixtures of one or more pure compounds can be employed, such as a kerosene or gasoline boiling range fraction of hydrocarbons. Conveniently, the solutions contain sufficient arene metal compound so as to give, upon admixture with the solid support, from about 0.01 to 30 grams of the di-arene metal compound for each 100 grams of the solid. To assure uniform impregnation, the amount of solvent is at least sufficient to saturate the solid, i.e. to completely wet the solid and fill the porous structure. Generally, the solutions contain from about 0.05 to 25 weight percent of the metal compound. When dilute solutions are employed, e.g. solutions containing 0.05 to 2 weight percent of metal compound, and when the amount of solvent is more than sufficient to saturate the solid support and provide a free liquid phase, it can be observed that the solid support removes or adsorbs the metal compound from the solution. Thus, the solutions become decolorized by contact with the support; and the support acquires a color which is characteristic for each metal compound.

In the practice of this invention a sufficient volume of the solution is taken so as to provide from about 0.01 to 30, preferably from 0.1 to 10 parts by weight of the metal compound for each 100 parts by weight of the support. The contact between the support and the metal compound can be effected in any convenient manner. Generally, particles of the support are dispersed in a solution of the metal compound. The solution can be poured over a bed of the particulate support. The temperature is conveniently the ambient temperature, but temperatures as low as the freezing point of the solvent to as high as 300° F. and above can be employed. Contact times from a few seconds to several hours are adequate. Any free solvent can be removed by decantation, centrifugation, filtration or other convenient means. The catalyst is then dried, for example, by heating at temperatures between 32° and 170° F. under vacuum.

In these operations of preparing the catalyst as well as during subsequent handling, precautions should be taken to exclude materials which destroy or otherwise adversely effect the catalytic properties. Oxygen and water, in particular, are excluded by minimizing contact with air and by employing dry solvents.

The solid supports which are employed in the preparation of the catalyst, as described above, are porous solids of the silica, alumina, and silica-alumina type. Such supports are well known to those skilled in the art and are available as commercial products. These types of supports are selected since it has been found that active catalysts for polymerization of 1-olefins such as ethylene were not formed when using other porous solids, e.g. charcoal. Further, with the supports of the silica, alumina, and silica-alumina types, active catalysts for ethylene polymerization are not formed with all of the arene metal compounds. For example, ditoluene molybdenum on silica-alumina did not give a highly effective polymerization catalyst. However, di-toluene molybdenum on silica-alumina is an active hydrogenation catalyst.

Prior to contact with the arene metal compound the solid support is pretreated so as to remove free water by heating at temperatures between about 900 to 2000° F., preferably 1000–1800° F. usually for a period of 0.5 to 48 hours. Heating in an atmosphere of nitrogen, hydrogen or other inert gas is one method for effective pretreatment of the support. In some cases the solid can be heated serially with more than one gas. We have heated catalysts first in dry air, then in nitrogen and then in hydrogen. After this pretreatment, the solid support is cooled and stored in a dry atmosphere. Subsequently, the support is impregnated with the arene metal compound as taught above.

These new catalysts, using chromium and vanadium as the metal component, are effective catalysts for the polymerization of ethylene. The polymerization of ethylene can be carried out in the vapor phase but is best carried out in the liquid phase, preferably in the presence of an inert diluent. Inert hydrocarbon diluents such as cyclohexane or isooctane are preferred.

The polymerization process can be batchwise or it can be continuous. Frequently, it is convenient to disperse the catalyst in the diluent and pass the resulting suspension to the reaction zone where the monomer is separately introduced. In some instances the monomer is dissolved in a separate portion of the diluent and then added to the reaction zone. The polymerization is carried out at a temperature in the range of 0° F., or lower, up to 450° F. A temperature in the range of 150 to 300° F. is generally employed and a temperature in the range of 250 to 300° F. is preferred. The pressure is not critical but it is preferred to maintain sufficient pressure to maintain liquid-phase conditions. With monomers which would normally be gaseous at reaction temperature, a monomer partial pressure of 100 to 500 p.s.i. is preferred since an increase in monomer partial pressure increases the reaction rate.

Our invention will be further described with reference to the following examples. These examples show the operability of the invention and advantages thereof and should not be considered limiting in any manner except as taught by the complete specification.

The following examples describe the preparation of catalysts in accordance with the teachings of this invention. Further, the utility of these catalysts for the polymerization of ethylene is demonstrated. The polymerization runs were all made substantially in the same manner. For each run a 1400 ml. stainless steel reactor was flushed with dry nitrogen and heated to a temperature of about 280° F. The catalyst was maintained under nitrogen during addition. The cyclohexane (226 grams) was charged to the reactor, next. Polymerization grade ethylene was admitted so as to reach and maintain a pressure of about 300 p.s.i.g. After a one hour reaction period at 280° F., heating of the reactor was terminated; and the reactor was vented so as to flash off the cyclohexane. The solid polymer thus recovered was dried in a vacuum oven at a temperature of about 210° F. for about 15 to 20 hours.

EXAMPLE I

*Preparation of Catalyst and Polymerization With Dicumene Chromium*

A commercial cracking catalyst having a silica to alumina weight ratio of 87 to 13 was activated by heating for 2 hours in a nitrogen atmosphere at a temperature of 1400° F. and then for 3 hours in a hydrogen atmosphere also at 1400° F. A sample of this pretreated silica-alumina support weighing 4.47 grams was dispersed in a dicumene chromium solution. The solution had been previously prepared by dissolving 0.57 gram of dicumene chromium in 15 ml. of cyclohexane. The cyclohexane had been distilled over calcium hydride. Upon addition of the pretreated support to the brown-red dicumene chromium solution the solution became clear and colorless. Cyclohexane was removed from the dispersion by vacuum distillation. The resulting catalyst was a yellow-brown, free-flowing powder, consisting essentially of dicumene chromium on silica-alumina. A sample of this catalyst weighing 0.54 gram, was used for the polymerization of ethylene as described above. There was recovered 40 grams of solid polyethylene. The production rate was computed to be 74 grams of polymer per gram of catalyst per hour. The product was a white, waxy solid and had the following properties:

Density _____ 0.922 g./cc. at 73.4° F.
Crystalline freeze point[1] _____ 233° F.
Melt index[2] _____ 245.

[1] Determined by melting a sample of the polymer, inserting a thermocouple into the molten polymer and allowing the molten polymer to cool slowly. The temperature versus time curve is obtained. The crystalline freeze point is the temperature corresponding to the first plateau on the time versus temperature curve.
[2] Determined according to the method of ASTM D-1238-52T except for the following modification: The orifice was plugged during the customary 5-minute preheat period. The time to extrude the total charge of approximately 9 grams was determined and used to calculate the amount extrudable in 10 minutes.

EXAMPLE II

*Preparation of Catalyst and Polymerization With Ditoluene Vanadium*

A sample of the same silica-alumina support used in Example I which had been activated by heating first in nitrogen and then in hydrogen was impregnated with ditoluene vanadium by dispersing 7.13 grams of the pretreated support in a solution prepared by dissolving 0.80 gram of ditoluene vanadium in 15 ml. of cyclohexane. Upon dispersing the silica-alumina support in the solution the brown color of the solution disappeared. After evaporation of the cyclohexane a brown free-flowing powder was produced. A sample of this catalyst weighing 2.60 grams was used for polymerization of ethylene at 280° F. and 300 p.s.i.g. as already described. The dry polyethylene which was recovered weighed 30 grams representing a production rate of 11.5 grams of polymer per gram of catalyst per hour.

EXAMPLE III

*Dicumene Chromium Used To Impregnate Silica*

A commercial silica gel was pretreated by heating according to the following schedule: (a) 4 hours in dry air at 1050° F., (b) 3 hours in nitrogen at 1830° F., and (c) 7 hours in hydrogen at 1830° F. A sample of this pretreated silica weighing 20.56 grams was dispersed in a solution prepared by dissolving 2.13 grams of dicumene chromium in 25 ml. of cyclohexane which has been distilled over calcium hydride. As for the previously described preparations, the cyclohexane was removed by distillation. A sample of the dry catalyst weighing 3.39 grams was charged to the polymerization reactor. The ethylene polymer yield amounted to 5.6 grams and represents a production rate of 1.7 grams of polymer per gram of catalyst per hour.

EXAMPLE IV

A control run was made using the same polymerization procedure as that of the previous examples. Commercial silica-alumina as used in Example I was first heated in $N_2$ at 1400° F. for 1 hour and was then heated in $H_2$ at 1400° F. for 4 hours. A 2.2 gram sample of the pretreated silica-alumina was utilized to effect polymerization of ethylene in the manner described in the previous examples. After a one hour polymerization period at 280° F. and 300 p.s.i.g., the recovered polymer amounted to 0.05 gram per gram of silica-alumina per hour. Thus the catalyst support had little, if any activity for polymerizing ethylene as compared to the support impregnated with the chromium and vanadium arene compounds.

The chromium, molybdenum, and vanadium arenes are effective hydrogenation catalysts. The hydrogenation of olefins and olefin-containing mixtures by contact with hydrogen or hydrogen-rich gas streams in the presence of these new catalysts can be effected by many of the prior art methods. The hydrogenation is effected in the gas phase and commonly in the liquid phase at temperatures in the range of about 120 to 750° F., preferably in the range of about 210 to 575° F. Reaction pressures range generally from about atmospheric pressure to pressures of 5000 p.s.i.g. and higher. Liquid phase reactions can be effected, if desired, in the presence of a diluent. Such liquid phase reactions are, of course, effected under sufficient pressure to maintain the reactants in solution at the temperature of hydrogenation. The diluents which are preferred are the saturated compounds which are inert under the hydrogenation conditions and which may be readily separated from the reaction products. The alkanes having 5 to 18 carbon atoms such as the pentanes, octanes, decanes, dodecanes, hexadecanes, octadecanes and mixtures of these alkanes are particularly suitable and readily available. The cycloalkanes and the alkylcycloalkanes, such as cyclopentane, cyclohexane, methylcyclohexane and cyclooctane are also excellent diluents. In many cases the catalysts of this invention are useful for the hydrogenation of an olefin-containing hydrocarbon stream such as a refinery stream obtained by the fractionation of crude oil or by fractionation of a catalytically or termally reformed refinery product. The hydrogenation of such products leads to fuels having enhanced stability. Such hydrogenated fuels have enhanced value as jet fuels. In one method of operation the olefin to be hydrogenated, such as ethylene, a propene, 1-butene, 2-butene, or cyclohexene, is charged to a suitable reactor containing the catalyst and diluent, such as cyclohexane. The reaction mixture is heated to a temperature in the range of 210 to 575° F. and contacted with hydrogen. The hydrogen can be admitted intermittently or continuously to maintain the desired reaction pressure, commonly 100 to 500 p.s.i.g. Reaction can be evidenced by noting the rate at which hydrogen gas is consumed and also as indicated by thermal changes which are reflected by decrease in the heat required to maintain the reaction temperature.

At the end of the reaction period so as to provide partial or complete hydrogenation the reaction mixture can be fractionated to recover unreacted hydrogen and to separate the catalyst for recycle in the process. The hydrogenated products are separated from unreacted olefins by any conventional means although fractionation by distillation is commonly preferred. Fractionation by chromatographic processes, by crystallization, adsorption, etc. are also applicable.

The contact times in the reaction zone can vary over wide limits so as to achieve the desired degree of hydrogenation. In many applications complete or nearly complete hydrogenation can be achieved quite rapidly, i.e., by contact times of the order of one second to 3 hours.

The practice of this invention relative to hydrogenation is further illustrated by the following examples.

EXAMPLE V

*Hydrogenation With Silica Impregnated With Dicumene Chromium*

A commercial silica gel was pretreated by heating in air at 1050° F. for 4 hours followed by heating in nitrogen at 1830° F for 3 hours and finally by heating in hydrogen at 1830° F. for 7 hours. A sample of this pretreated silica weighing 12.96 grams was dispersed in a solution prepared by dissolving 1.14 grams of dicumene chromium in 15 ml. of cyclohexane. The cyclohexane had been previously dried by distillation in the presence of calcium hydride. The cyclohexane was removed by distillation at reduced pressure. The resulting dry, powdery catalyst was stored under an atmosphere of dry nitrogen. The hydrogenation of 1-butene in the presence of this catalyst was effected according to the following procedure. A 1400 ml. stainless steel reactor was flushed with dry nitrogen and heated to 280° F. The reactor was then charged with 3 grams of the catalyst followed by 0.5 pound of dry cyclohexane and 0.3 pound of a pure grade 1-butene. Hydrogen was admitted to the reactor thereby increasing the pressure from an initial value of about 220 p.s.i.g. to a final value at the end of the 90 minute reaction period of 410 p.s.i.g. The hydrogen addition was made at a nearly constant rate. Rapid reaction began when the reaction pressure reached a value in the range 290–320 p.s.i.g. as indicated by the fact that the reaction pressure remained within this range for about a 50 minute interval while the hydrogen was being admitted continuously. At the end of the 90 minute reaction period the solvent was removed by distillation. The $C_4$ hydrocarbons which were recovered were analyzed for butenes and butane. From the results obtained the conversion of 1-butene to normal butane was found to be 98 percent.

EXAMPLE VI

*Hydrogenation With Ditoluene Molybdenum on Silica-Alumina Support*

A commercial silica-alumina having a silica to alumina ratio by weight of about 87/13 was pretreated by heating in nitrogen at 1400° F. for 12 hours followed by heating in hydrogen at 1400° F. for 3 hours. Approximately 15 grams of the dried silica-alumina was dispersed in a solution prepared by dissolving 1.26 grams of ditoluene molybdenum in 30 ml. of dry cyclohexane. The cyclohexane was removed by distillation at reduced pressure. A sample of the resulting dried catalyst weighing 2.68 grams was used for the hydrogenation of 1-butene according to the procedure stated in Example V except that the duration of the run was one hour. Rapid hydrogenation of the 1-butene occurred at a reaction pressure of about 270 p.s.i.g. By fractionation of the $C_4$ hydrocarbons the conversion of the 1-butene to normal butane was found to be 83 percent.

EXAMPLE VII

*Hydrogenation With Ditoluene Vanadium on Silica-Alumina Support*

The pretreated silica-alumina support described in Example VI was impregnated with ditoluene vanadium by adding 7.18 grams of the silica-alumina to a solution prepared by dissolving 0.49 gram of the ditoluene vanadium in 20 ml. of cyclohexane. After removal of the cyclohexane a free-flowing powder resulted. A sample weighing 3.48 grams was charged to the polymerization reactor together with 0.5 pound of dry cyclohexane and 0.3 pound 1-butene. The hydrogenation of the 1-butene was affected according to the procedure given in Example V except that the reaction period was one hour and the reaction pressure was between 100 and 300 p.s.i.g. By analysis of the reaction mixture the percent conversion of 1-butene to normal butane was found to be 92 percent.

EXAMPLE VIII

*Hydrogenation With Dicumene Chromium on Silica-Alumina Support*

The commercial silica-alumina support described in Example VI was heated according to the following schedule: 5½ hours in nitrogen at 1830° F. followed by 5 hours in hydrogen at 1830° F. A sample of the dried support weighing 20 grams was dispersed in a solution prepared by dissolving 2.62 grams of dicumene chromium in 25 ml. of cyclohexane. After distillation of the cyclohexane a free-flowing catalyst resulted. A sample of this catalyst weighing 3.21 grams was charged to the hydrogenation reactor to effect hydrogenation of 1-butene according to the procedure given in Example V except that the total reaction time was 110 minutes and the major portion of the reaction occurred at a pressure of about 415 pounds. The conversion of the 1-butene to normal butane was found to be 98 percent.

EXAMPLE IX

*Attempted Hydrogenation With Dicumene Chromium*

A control run was made using butene-1 as the olefin and using the hydrogenation procedure described in Example V except that as the catalyst there was employed 1.14 grams of dicumene chromium. There was no indication of reaction from either the pressure variation during addition of hydrogen to the reactor or from evidence of the heat required to maintain the reaction temperature. Further, fractionation of the $C_4$ hydrocarbons which were recovered from the reactor indicated that no hydrogenated products were formed.

Certain modifications of the invention will become apparent to those skilled in the art and the illustrative details disclosed are not to be construed as imposing unnecessary limitations on the invention.

We claim:

1. A moisture-free catalyst consisting essentially of a solid porous support selected from the group silica, alumina, and silica-alumina having impregnated therein a compound having the structure

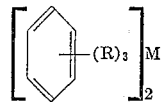

where M is a metal selected from the group consisting of chromium, vanadium, and molybdenum, and R is selected from the group consisting of hydrogen and alkyl radicals having 1 to 6 carbon atoms.

2. The catalyst of claim 1 wherein M is chromium.
3. The catalyst of claim 1 wherein M is vanadium.
4. The catalyst of claim 1 wherein M is molybdenum.
5. The catalyst of claim 1 wherein said support is silica-alumina.
6. The catalyst of claim 1 wherein said support is silica.
7. The catalyst of claim 1 wherein said support is alumina.

References Cited in the file of this patent

UNITED STATES PATENTS

| | | |
|---|---|---|
| 2,564,964 | Engle | Aug. 21, 1951 |
| 2,879,263 | Anderson et al. | Mar. 24, 1959 |
| 2,887,471 | Shearer et al. | May 19, 1959 |
| 2,905,645 | Anderson et al. | Sept. 22, 1959 |
| 2,925,392 | Seelbach et al. | Feb. 16, 1960 |
| 2,953,586 | Hafner et al. | Sept. 20, 1960 |

FOREIGN PATENTS

| | | |
|---|---|---|
| 1,157,748 | France | Dec. 30, 1957 |
| 218,210 | Australia | Nov. 3, 1958 |